United States Patent
Ito

(10) Patent No.: US 10,359,973 B2
(45) Date of Patent: Jul. 23, 2019

(54) IMAGE FORMING APPARATUS ADJUSTING IMAGE FORMING POSITION ON SHEET

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/867,029

(22) Filed: Jan. 10, 2018

(65) Prior Publication Data
US 2018/0203645 A1    Jul. 19, 2018

(30) Foreign Application Priority Data
Jan. 13, 2017    (JP) .................... 2017-004548

(51) Int. Cl.
*G06F 3/12* (2006.01)
*H04N 1/00* (2006.01)
(Continued)

(52) U.S. Cl.
CPC ....... *G06F 3/1201* (2013.01); *G03G 15/0189* (2013.01); *G03G 15/0848* (2013.01); *G03G 15/20* (2013.01); *G03G 15/5062* (2013.01); *G06F 3/1205* (2013.01); *G06F 3/1208* (2013.01); *G06F 3/1231* (2013.01); *G06F 3/1253* (2013.01); *H04N 1/0057* (2013.01); *B41J 13/32* (2013.01); *G03G 15/605* (2013.01);
(Continued)

(58) Field of Classification Search
None
See application file for complete search history.

(56) References Cited

U.S. PATENT DOCUMENTS

2002/0149805 A1* 10/2002 Tanaka ............... H04N 1/00718
358/498
2008/0219685 A1* 9/2008 Muratani ............... B41J 11/003
399/45

(Continued)

FOREIGN PATENT DOCUMENTS

JP    2005-221582 A    8/2005

OTHER PUBLICATIONS

Machine translation in english of JP Pub 2005-221582 to Kazama et al.*

*Primary Examiner* — Benny Q Tieu
*Assistant Examiner* — Haris Sabah
(74) *Attorney, Agent, or Firm* — Canon U.S.A., Inc. IP Division

(57) ABSTRACT

An image forming apparatus includes a selection unit configured to select a sheet type, an image processing unit configured to perform image processing on image data, based on a correction condition that corresponds to the selected sheet type, a conveyance unit configured to convey a sheet, and an image forming unit configured to form an image on the sheet, based on the image data, wherein the image processing unit performs the image processing on the image data, based on a first correction condition that corresponds to a sheet to be conveyed by the conveyance unit in a first direction, and wherein the image processing unit performs the image processing on the image data, based on a second correction condition that corresponds to a sheet to be conveyed by the conveyance unit in a second direction, the second direction being different from the first direction.

5 Claims, 10 Drawing Sheets

(51) Int. Cl.
  *G03G 15/20* (2006.01)
  *G03G 15/01* (2006.01)
  *G03G 15/08* (2006.01)
  *G03G 15/00* (2006.01)
  *B41J 13/32* (2006.01)
(52) U.S. Cl.
  CPC ....... *G03G 15/607* (2013.01); *G03G 15/6567* (2013.01); *G03G 2215/00358* (2013.01); *G03G 2215/00383* (2013.01)

(56) References Cited

U.S. PATENT DOCUMENTS

2012/0027477 A1\* 2/2012 Nakayama ......... G03G 15/2064
    399/328
2014/0176969 A1\* 6/2014 Yano ................. G06K 15/4065
    358/1.9

\* cited by examiner

FIG.4

| SHEET NAME | SHEET SIZE | BASIS WEIGHT (g/m²) | SURFACE PROPERTY | GRAIN |
|---|---|---|---|---|
| ABC PAPER INDUSTRY RECYCLE 1 | A3 | 75 | PLAIN PAPER | LONG |
| ABC PAPER INDUSTRY RECYCLE 2 | A4 | 75 | PLAIN PAPER | SHORT |
| DEF PAPER INDUSTRY EMBOSSED PAPER A-1 | 11 × 17 | 150 | EMBOSSED | LONG |
| DEF PAPER INDUSTRY COATED PAPER P-1 | LTR | 128 | BOTH-SURFACE COATED | LONG |
| XYZ PAPER INDUSTRY FINE PAPER 81 | A4 | 75 | PLAIN PAPER | SHORT |
| XYZ PAPER INDUSTRY FINE PAPER 82 | A3 | 75 | PLAIN PAPER | SHORT |

EDITING OF SHEET LIBRARY

NEW ADDITION | EDITING | DELETION | PRINTING POSITION ADJUSTMENT

FIG.5

EDITING OF SHEET ATTRIBUTE — 0501

| | | |
|---|---|---|
| SHEET NAME | XYZ PAPER INDUSTRY FINE PAPER 81 | 0502 |
| SHEET SIZE | A4 | 0503 |
| BASIS WEIGHT (g/m$^2$) | 75 | 0504 |
| SURFACE PROPERTY | PLAIN PAPER ▼ | 0505 |
| GRAIN | SHORT ▼ | 0506 |
| PREPRINTED PAPER | ☑ | 0507 |

0508 — END EDIT    0509 — CANCEL

FIG. 6

| SHEET LIBRARY 0609 | | | | | | | |
|---|---|---|---|---|---|---|---|
| SHEET NAME | SIZE | BASIS WEIGHT (g/m²) | SURFACE PROPERTY | GRAIN | PREPRINTED PAPER | PRINTING POSITION DEVIATION AMOUNT IN VERTICAL PLACEMENT (FRONT SURFACE) | PRINTING POSITION DEVIATION AMOUNT IN VERTICAL PLACEMENT (REAR SURFACE) | PRINTING POSITION DEVIATION AMOUNT IN HORIZONTAL PLACEMENT (FRONT SURFACE) | PRINTING POSITION DEVIATION AMOUNT IN HORIZONTAL PLACEMENT (REAR SURFACE) |

(Table columns 0610–0618; rows 0601–0608 containing sheet data including ABC PAPER INDUSTRY RECYCLE 1, ABC PAPER INDUSTRY RECYCLE 2, DEF PAPER INDUSTRY EMBOSSED PAPER A-1, DEF PAPER INDUSTRY BOTH-SURFACE COATED PAPER P-1, XYZ PAPER INDUSTRY FINE PAPER B1, XYZ PAPER INDUSTRY FINE PAPER B2, FGH PAPER INDUSTRY SECTION PAPER 75, FGH PAPER INDUSTRY PLAIN PAPER 2, with per-cell LEAD POSITION, SIDE POSITION, MAIN-SCANNING MAGNIFICATION, SUB-SCANNING MAGNIFICATION values.)

FIG.7
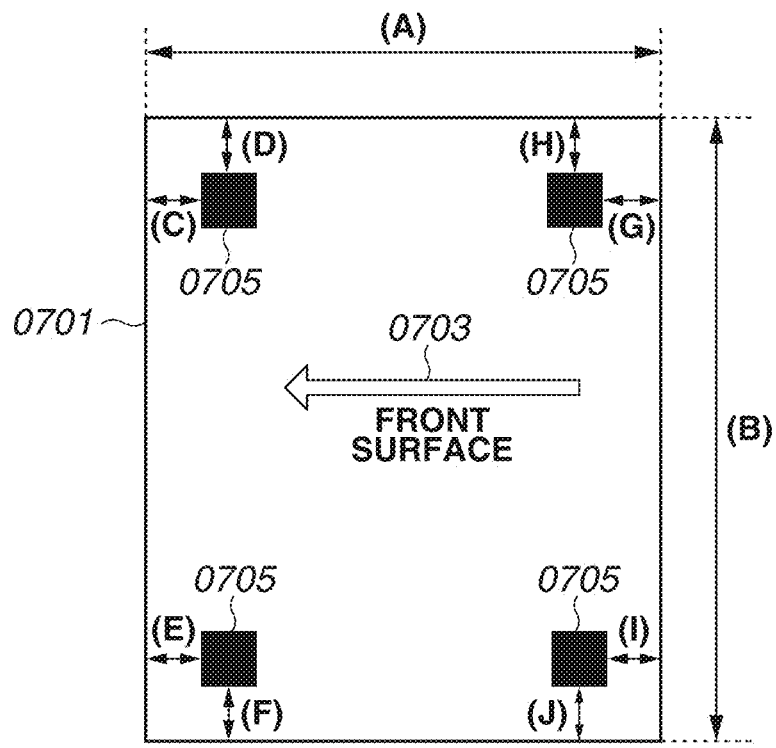
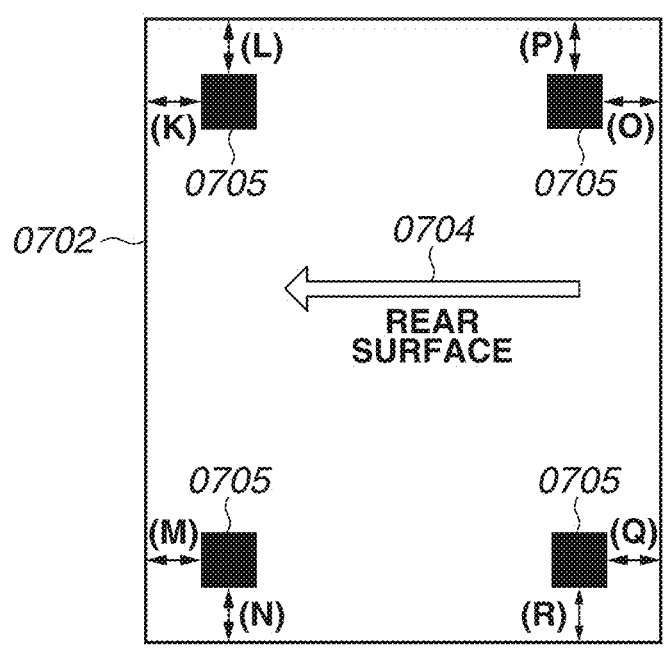

FIG.8

| | MEASURED VALUE | IDEAL VALUE | PRINTING POSITION DEVIATION AMOUNT |
|---|---|---|---|
| 0801 LEAD POSITION (FRONT SURFACE) | $\frac{(C)+(E)}{2}$ | 1 cm | MEASURED VALUE − IDEAL VALUE |
| 0802 SIDE POSITION (FRONT SURFACE) | $\frac{(F)+(J)}{2}$ | 1 cm | MEASURED VALUE − IDEAL VALUE |
| 0803 MAIN-SCANNING MAGNIFICATION (FRONT SURFACE) | $\frac{((B)-(D)-(F))+((B)-(H)-(J))}{2}$ | SHEET LENGTH IN MAIN-SCANNING DIRECTION − 2cm | (MEASURED VALUE − IDEAL VALUE) / IDEAL VALUE |
| 0804 SUB-SCANNING MAGNIFICATION (FRONT SURFACE) | $\frac{((A)-(C)-(G))+((A)-(E)-(I))}{2}$ | SHEET LENGTH IN SUB-SCANNING DIRECTION − 2cm | (MEASURED VALUE − IDEAL VALUE) / IDEAL VALUE |
| 0805 LEAD POSITION (REAR SURFACE) | $\frac{(K)+(M)}{2}$ | 1 cm | MEASURED VALUE − IDEAL VALUE |
| 0806 SIDE POSITION (REAR SURFACE) | $\frac{(N)+(R)}{2}$ | 1 cm | MEASURED VALUE − IDEAL VALUE |
| 0807 MAIN-SCANNING MAGNIFICATION (REAR SURFACE) | $\frac{((B)-(L)-(N))+((B)-(P)-(R))}{2}$ | SHEET LENGTH IN MAIN-SCANNING DIRECTION − 2cm | (MEASURED VALUE − IDEAL VALUE) / IDEAL VALUE |
| 0808 SUB-SCANNING MAGNIFICATION (REAR SURFACE) | $\frac{((A)-(K)-(O))+((A)-(M)-(Q))}{2}$ | SHEET LENGTH IN SUB-SCANNING DIRECTION − 2cm | (MEASURED VALUE − IDEAL VALUE) / IDEAL VALUE |

0810 0811 0812

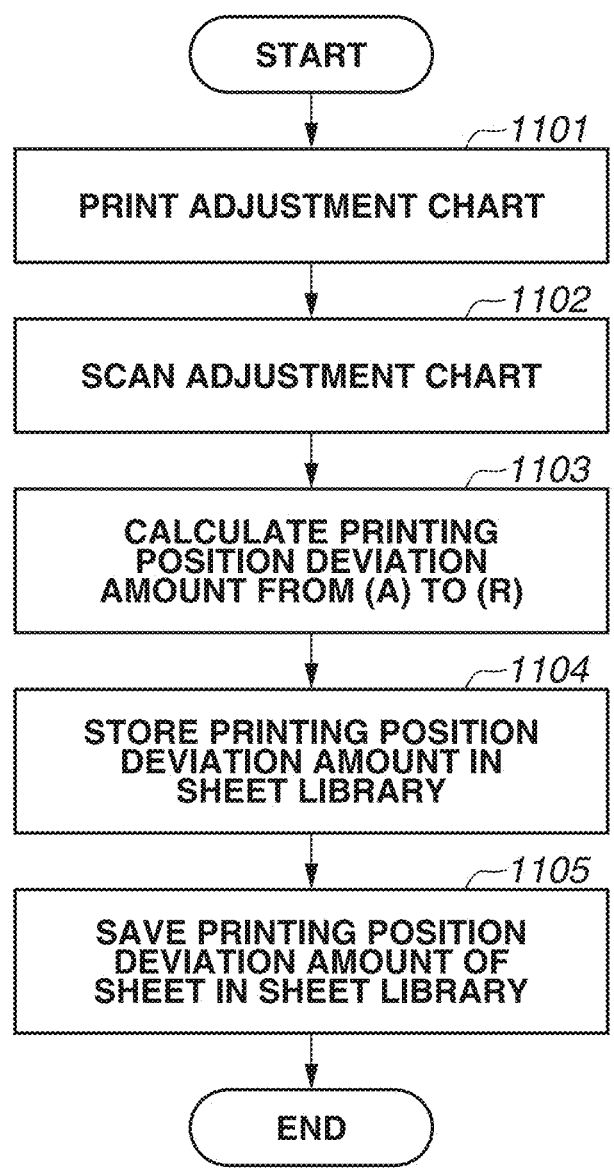

IMAGE FORMING APPARATUS ADJUSTING IMAGE FORMING POSITION ON SHEET

BACKGROUND OF THE INVENTION

Field of the Invention

The present invention relates to printing position adjustment control that adjusts an image forming position on a sheet.

Description of the Related Art

A typical image forming apparatus includes a function of adjusting a printing position of an image (hereinafter, referred to as "printing position adjustment") in order to print an image at an intentional position of a sheet. Adjusting the printing position makes it possible to align the printing position of an image on a front surface and the printing position of an image on a rear surface with high accuracy in both-surface printing to provide a high-quality printed matter. Further, for example, in a case of printing an image on a preprinted paper on which ruled lines and the like are previously printed, it is possible to provide a high-quality printed matter in which the ruled lines and the image are printed so as not to be overlapped with each other.

It is necessary to perform the printing position adjustment for each sheet on which the image is to be printed, because an expansion/contraction amount of a sheet is varied depending on a size, a basis weight (weight), quality, etc. of the sheet.

The printing position adjustment is commonly performed with use of an adjustment chart that is created by printing a mark on a sheet to be adjusted. The image forming apparatus detects a deviation amount of the printing position, based on, for example, information of a length from a reference position to the mark of the adjustment chart, and determines a correction condition to correct the printing position, based on a detection result. Further, the image forming apparatus corrects the printing position, based on the correction condition in a case where printing processing is performed with use of a sheet of the same type as the sheet to be adjusted.

It was known from an experiment that a dimension of the sheet is varied depending on a moisture content. For example, when an image is printed with use of sheets of the same types that are left under environment different in humidity, printing positions on the sheets are different from each other as a result. The sheet used for printing is typically sold while being wrapped by a wrapping paper to maintain sheet quality. For example, the wrapping paper has been subjected to a special treatment in order to prevent the sheet from absorbing moisture. In a case where the sheet is housed in a container of the image forming apparatus, an operator opens the wrapping paper and houses the sheet in the container. Therefore, the moisture content of the sheet may start to change after unwrapping.

In a case where the sheet taken out from the wrapping paper is housed in the container of the image forming apparatus that is placed in a room with low humidity, the moisture content of the sheet is decreased with time. Accordingly, the dimension of the sheet that has been housed in the container for a long term is reduced as compared with the dimension of the sheet immediately after unwrapping. Alternatively, depending on a type of the sheet, the dimension of the sheet that has been housed in the container for a long term may be increased as compared with the dimension of the sheet immediately after unwrapping.

An image forming apparatus discussed in Japanese Patent Application Laid-Open No. 2005-221582 includes a timer, automatically prints a test sheet every time operation time of the image forming apparatus becomes a predetermined time, conveys the test sheet to a reading sensor, and adjusts a printing position, based on a reading result of a test image on the test sheet.

Various types of sheets are housed in the container of the image forming apparatus. For example, the sheets of the type called A4 and LTR are conveyable in any of the following directions: a direction in which a conveyance direction of the sheet conveyed by the image forming apparatus and a longitudinal direction of the sheet are orthogonal to each other (hereinafter, referred to as vertical placement), and a direction in which the conveyance direction and the longitudinal direction of the sheet are parallel to each other (hereinafter, referred to as horizontal placement).

The sheet has a known physical property that is called grain. This indicates a direction of fibers of the sheet. The fibers of the sheet are likely aligned in a direction in which pulp flows in a manufacturing process of the sheet. The sheet is manufactured by cutting a roll-shaped long sheet. Accordingly, the grain of the roll-shaped sheet is fixed in one direction. Depending on a cut direction when the long sheet is cut, however, two types of sheets, a sheet having the grain parallel to a long side (hereinafter, referred to as long grain) and a sheet having the grain parallel to a short side (hereinafter, referred to as short grain) are manufactured. In other words, the grain is a property determined by the manufacturing process of the sheet.

A sheet has a property of expansion/contraction caused by drying and absorption of moisture. Further, it is known that the direction and the degree of expansion/contraction are changed depending on the direction of the grain. In other words, the direction and the degree of expansion/contraction may be different in sheets having the vertical grain and the horizontal grain even in a case of the same type of sheets with the same size. For example, the conveyance direction of the sheet and the grain are parallel to each other when the A4 sheet of the horizontal grain is vertically placed, and the conveyance direction of the sheet and the grain are orthogonal to each other when the A4 sheet of the horizontal grain is horizontally placed. For example, the conveyance direction of the sheet and the grain are orthogonal to each other when the A4 sheet of the vertical grain is vertically placed, and the conveyance direction of the sheet and the grain are parallel to each other when the A4 sheet of the vertical grain is horizontally placed. Accordingly, there are two cases of the vertical grain and the horizontal grain even though sheets have the same A4 size and are placed vertically. In other words, even in the case of a predetermined type of A4 sheet, parameters for adjustment of the printing position may be different from each other depending on whether the A4 sheets are housed in vertical placement or in horizontal placement.

SUMMARY OF THE INVENTION

According to embodiments of the present invention, an image forming apparatus includes a selection unit configured to select a sheet type, an image processing unit configured to perform image processing on image data, based on a correction condition that corresponds to the sheet type selected by the selection unit, a conveyance unit configured to convey a sheet of the sheet type selected by the selection unit, and an image forming unit configured to form an image on the sheet conveyed by the conveyance unit, based on the image data on which the image processing is performed by the image processing unit, wherein the image processing unit performs the image processing on the image data, based on a first correction condition that corresponds to a sheet to be conveyed by the conveyance unit in a first direction, and a sheet type of the sheet corresponding to a predetermined type, and wherein the image processing unit performs the image processing on the image data, based on a second correction condition that corresponds to a sheet to be conveyed by the conveyance unit in a second direction, the second direction being different from the first direction, a sheet type of the sheet corresponding to the predetermined type.

Further features of the present invention will become apparent from the following description of exemplary embodiments with reference to the attached drawings.

BRIEF DESCRIPTION OF THE DRAWINGS

FIG. 4 illustrates an interface screen on which operation to a sheet library is performed.

FIG. 5 illustrates an interface screen on which editing of sheet information is performed.

FIG. 6 is a schematic diagram illustrating the sheet library.

FIG. 7 illustrates an adjustment chart used in printing position adjustment.

FIG. 8 is a diagram illustrating a method of calculating a printing position deviation amount from a measured value of the adjustment chart.

FIG. 10 is an operation flowchart of the printing apparatus in the printing position adjustment.

DESCRIPTION OF THE EMBODIMENTS

Some exemplary embodiments of the present invention are described below with reference to drawings. Unless otherwise noted, embodiments of the present invention are applicable even to a single apparatus or a printing system including a plurality of apparatuses as long as functions according to embodiments of the present invention are achieved. Further, unless otherwise noted, embodiments of the present invention are applicable even to a printing system that is connected and processed through a network, such as a local area network (LAN) and a wide area network (WAN), as long as the functions according to embodiments of the present invention are achieved. In other words, a system configuration in which various types of terminals are connected described in the following exemplary embodiments are illustrative, and there are various configuration examples depending on an application and a purpose.

Figure 1:
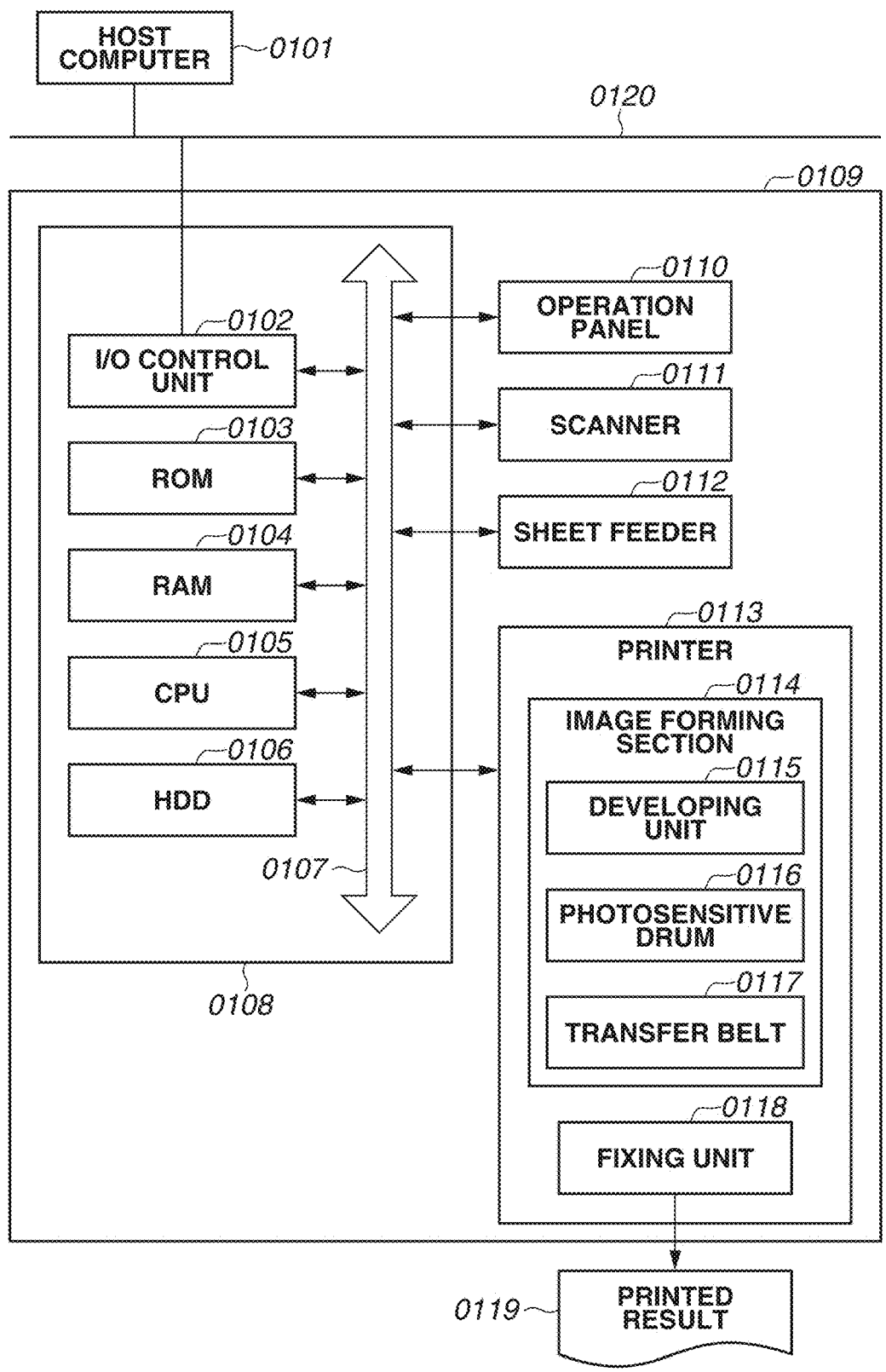
FIG. 1 is a control block diagram of a printing apparatus.

FIG. 1 is a block diagram illustrating a hardware schematic configuration as an exemplary embodiment of an image forming apparatus. The image forming apparatus of the first exemplary embodiment is described with use of an electrophotographic printing apparatus. Alternatively, the printing apparatus in the first exemplary embodiment may be of a different image forming system, such as an inkjet system and an offset system.

In the first exemplary embodiment, a printing apparatus 0109 and a host computer 0101 are connected to each other by a communication line network 0120. A plurality of host computers, printing apparatus, etc. may be connected to one another.

The host computer 0101 can acquire information input by a user through an unillustrated input device, and can create a print job to transmit the print job to the printing apparatus 0109. A controller 0108 performs various kinds of data processing to control operation of the printing apparatus 0109. An operation panel 0110 receives various kinds of operation from the user through a touch panel system. A scanner 0111 uses an optical sensor to scan an original document, and acquires scan image data. In the first exemplary embodiment, an automatic document feeder (ADF) reading in which a plurality of documents are placed on a feeder and are read is described as a method of reading the image by the scanner 0111. Alternatively, for example, a pressure plate reading in which a document is placed on a platen glass one by one may be used.

A sheet feeder 0112 includes a plurality of sheet decks. It is possible to stack and house sheets in each of the sheet decks. It is possible for each of the sheet decks to separate only an uppermost sheet of the housed sheets and to convey the sheet to a printer 0113. The printer 0113 physically prints the image data on the sheet. A printed result 0119 is obtained from the printer 0113.

Next, a configuration of the controller 0108 is described. An input/output (I/O) control unit 0102 controls communication with the communication line network 0120. A read only memory (ROM) 0103 holds various kinds of control programs. A central processing unit (CPU) 0105 performs control and calculation in each unit of the printing apparatus 0109 through a system bus 0107. In addition, the CPU 0105 executes the programs that are held by the ROM 0103 and loaded to a random access memory (RAM) 0104. The RAM 0104 is a kind of common volatile storage device that is directly accessed by the CPU 0105, and is used as a work area of the CPU 0105 or a temporal data storage region. A hard disk drive (HDD) 0106 is a HDD that is used to hold a large capacity of data, such as image data and print data, temporarily or for a long term. These modules are connected to one another through the system bus 0107. Further, the system bus 0107 connects the controller 0108 and each device in the printing apparatus 0109 to each other. The RAM 0104 also functions as a main memory or a work memory of the CPU 0105. Moreover, the control programs and an operating system are stored not only in the ROM 0103 but also in the HDD 0106. An unillustrated non-volatile random access memory (NVRAM) may be further provided, and may hold printing apparatus mode setting information provided from the operation panel 0110.

Next, a configuration of the printer 0113 is described. An image forming section 0114 includes a developing unit 0115, a photosensitive drum 0116, and a transfer belt 0117. The image forming section 0114 uses the developing unit 0115 to form a toner image around the photosensitive drum 0116 according to the image data generated by the controller 0108, and transfers the formed toner image on the sheet conveyed on the transfer belt 0117. A fixing unit 0118 fixes the toner image that has been transferred on the sheet by the image forming section 0114. The fixing unit 0118 includes unillustrated pressure rollers and unillustrated heating rollers, and melts and presses the toner when the sheet passes between the rollers, whereby the toner image is fixed on the sheet.

Figure 2:
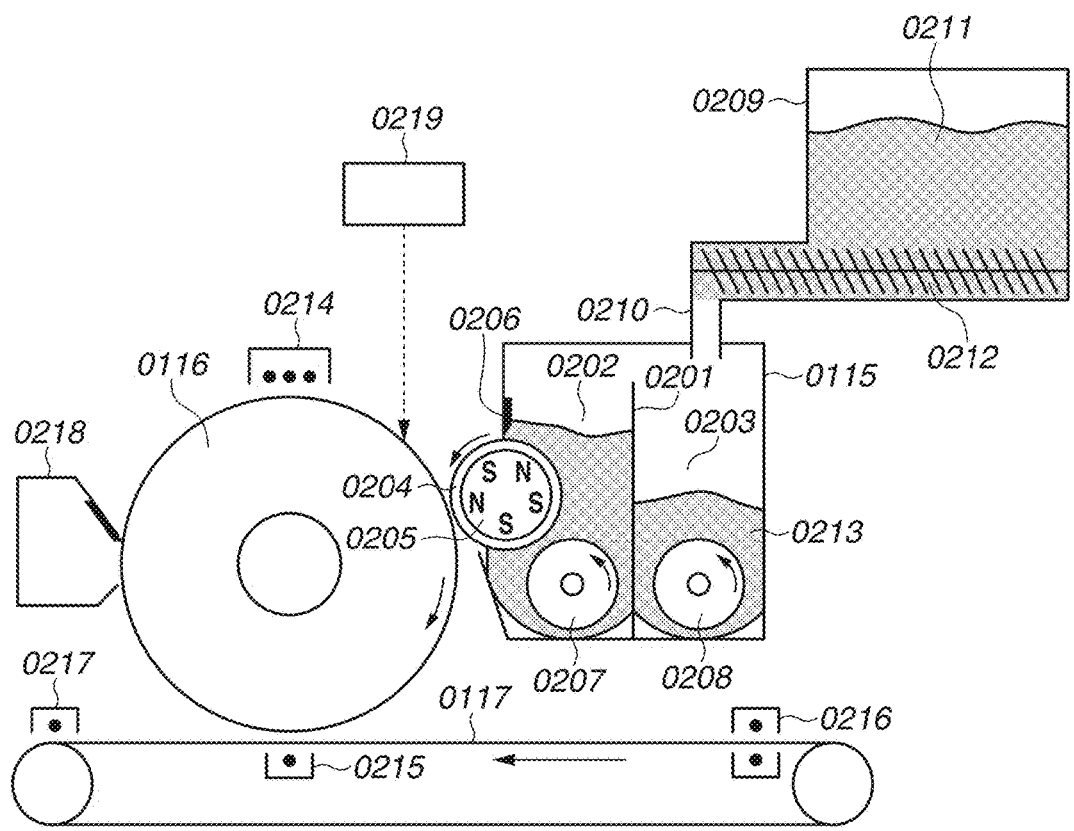
FIG. 2 is a schematic diagram illustrating a configuration of an image forming section.

FIG. 2 illustrates a configuration of the image forming section 0114 according to the first exemplary embodiment. The developing unit 0115 is disposed to face the photosensitive drum 0116, and an inside thereof is partitioned into a developing chamber 0202 and an agitation chamber 0203 by a partition 0201 that extends in a perpendicular direction.

A nonmagnetic developing sleeve 0204 that is rotated in an arrow direction is disposed in the developing chamber 0202, and a magnet 0205 is fixed and disposed inside the developing sleeve 0204. For example, a two-component developer that contains magnetic carriers and nonmagnetic toner is housed in the developing unit 0115. The developing sleeve 0204 carries the developer that is regulated in layer thickness by a blade 0206, and supplies the developer to the photosensitive drum 0116 in a developing region facing the photosensitive drum 0116 to develop an electrostatic latent image on the photosensitive drum 0116. To improve developing efficiency, namely, a providing rate of the toner to the electrostatic latent image, a developing bias voltage that is a DC voltage superimposed on an AC voltage is applied to the developing sleeve 0204. Agitation screws 0207 and 0208 are disposed in the developing chamber 0202 and the agitation chamber 0203, respectively.

The screw 0207 agitates and conveys the developer in the developing chamber 0202. The screw 0208 agitates and conveys toner 0211 that has been supplied from a toner discharge port 0210 of a toner replenishment tank 0209 by rotation of a conveyance screw 0212 and a developer 0213 already in the developing unit 0115, whereby toner density is uniformed. The partition 0201 includes developer passages (not illustrated) that communicate the developing chamber 0202 and the agitation chamber 0203 with each other at a front end part and a rear end part in FIG. 2. The developer in the developing chamber 0202 that has been lowered in toner density due to consumption of the toner by development is moved into the agitation chamber 0203 through one of the developer passages by conveyance force of the screws 0207 and 0208. Further, the developer that has been recovered in toner density in the agitation chamber 0203 is moved into the developing chamber 0202 through the other developer passage.

The photosensitive drum 0116 is rotated and driven in an illustrated arrow direction. A charger 0214, the developing unit 0115, a transfer charger 0215, and a drum cleaner 0218 are disposed around the photosensitive drum 0116. The charger 0214 uniformly charges the photosensitive drum 0116, and the transfer charger 0215 transfers a developed and thus visualized toner image to the print sheet.

In addition, an image exposure device 0219 is provided above the photosensitive drum 0116. The image exposure device 0219 includes a semiconductor laser, a polygon mirror, a reflector, and the like. The image exposure device 0219 receives input of a digital pixel signal (video data) corresponding to the image that has been converted into a digital signal by the controller 0108, and applies a laser beam modulated based on the signal. The image exposure device 0219 applies the laser beam so as to perform scanning in a generatrix line direction of the photosensitive drum 0116 between the charger 0214 and the developing unit 0115, and exposes a drum surface of the photosensitive drum 0116 to form the electrostatic latent image. Thereafter, the photosensitive drum 0116 is rotated to develop the electrostatic latent image to the visualized toner image by the developing unit 0115.

The endless transfer belt 0117 that conveys the sheet in a direction illustrated by an arrow is stretched between a plurality of rollers, below the photosensitive drum 0116. The sheet conveyed from the sheet feeder 0112 is supplied from right side of the transfer belt 0117, and is carried by the transfer belt 0117 under action of absorption chargers 0216 that are oppositely disposed to sandwich the transfer belt 0117, whereby the sheet is conveyed leftward. When the sheet passes between the photosensitive drum 0116 and the transfer charger 0215, the visualized toner image developed on the photosensitive drum 0116 is transferred to the sheet through action of the transfer charger 0215. The sheet on which the toner image has been transferred is separated from the transfer belt 0117 by a discharging charger 0217, and is conveyed to the unillustrated fixing unit 0118. The remaining toner on the photosensitive drum 0116 after the toner transfer to the sheet is removed by the drum cleaner 0218.

Figure 3:
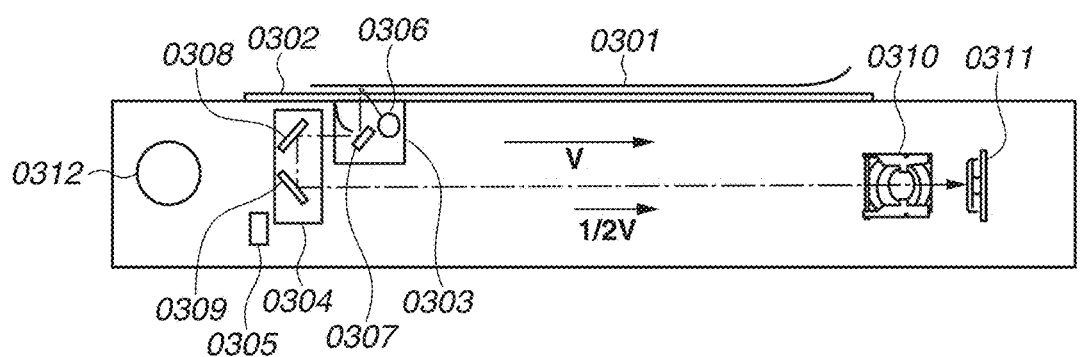
FIG. 3 is a schematic diagram illustrating a configuration of a scanner.

FIG. 3 is a cross-sectional view illustrating a configuration of a reading unit of the scanner 0111.

In FIG. 3, a document 0301 to be read is placed on a platen glass 0302, and scan operation is started by, as a trigger, pressing a start key (not illustrated) of the operation panel 0110, pressing a reading start button displayed on a touch panel unit (not illustrated), or the like.

When the scan operation is started, a first mirror unit 0303 and a second mirror unit 0304 once return to a home position at which a home position sensor 0305 is located, and a document illumination lamp 0306 is turned on and light is applied to the document. Light reflected from the document passes through a first mirror 0307 in the first mirror unit 0303 and a second mirror 0308 and a third mirror 0309 in the second mirror unit 0304. The light is then imaged on a charge coupled device (CCD) sensor 0311 through a lens 0310, and is provided to the CCD sensor 0311 as an optical signal.

In this case, the first mirror unit 0303 and the second mirror unit 0304 are driven by one document scanner motor 0312. The second mirror unit 0304 moves at a speed (V/2) that is half of a speed (V) of the first mirror unit 0303, through application of a moving pulley system, to scan the entire surface of the document.

In the first exemplary embodiment, the printing position adjustment method using a pressure plate of the scanner 0111 is described. However, the printing position adjustment method is not limited to the configuration. For example, a reading sensor or an image diagnosis camera may be mounted on a sheet conveyance path of the printing apparatus 0109 in printing, and the document may be automatically read during the sheet conveyance to detect a printing position deviation amount. In other words, the reading method of the adjustment chart described in the first exemplary embodiment is illustrative, and a method of detecting the printing position deviation amount, detection timing, etc. do not limit the following configuration.

The sheet used in the printing apparatus 0109 is managed with use of a database that is called sheet library by the user. The sheet library is saved in the ROM 0103 or the HDD 0106, and is read or written by each software module as necessary. A detailed configuration of the sheet library is described later with reference to FIG. 6.

FIG. 4 is a schematic diagram illustrating an interface screen on which the user performs operation such as editing of the sheet library, in the printing system according to the first exemplary embodiment. An interface screen 0401 is displayed on the operation panel 0110 by the CPU 0105.

The sheet information held by the sheet library is displayed in a sheet list 0407. In the sheet list 0407, sheet attributes for each sheet illustrated in columns 0402 to 0406 are presented as accompanying information to the user. The column 0402 indicates a sheet name of each of the sheets. The sheet names are specified by the user, etc. so as to allow the sheets to be identified from one another. The column 0403 indicates the size of each of the sheets. In this case, only regular sizes such as A3 and LTR are displayed. However, a custom size in which the user freely inputs the size in each of a main-scanning direction and a sub-scanning direction is also acceptable. The column 0404 indicates a basis weight of each of the sheets. The column 0405 indicates surface property of each of the sheets. The surface property used herein is an attribute indicating a physical property of a sheet surface, which includes "coated", "embossed", etc. "Coated" indicates a surface coated for enhancement of glossiness. "Embossed" indicates a surface having irregularity. The column 0406 indicates grain of each of the sheets. The user can select any sheet from the sheet list 0407 by touching a portion on which the desired sheet is displayed, on the operation panel 0110. The selected sheet is highlighted (inversely displayed). FIG. 4 illustrates a state where "XYZ paper industry, fine paper 81" is selected as an example. Further, in a case where the number of sheet recorded in the sheet library is larger than the number of sheets displayable on the sheet list 0407 at once, a scroll bar 0408 is used. The user can select a desired sheet by operating the scroll bar 0408.

A new addition button 0409 is a button to newly add a sheet to the sheet library. An editing button 0410 is a button to edit the sheet attributes of the sheet selected in the sheet list 0407. When the new addition button 0409 or the editing button 0410 is pressed, an interface screen illustrated in FIG. 5 is displayed. A deletion button 0411 is a button to delete the sheet selected in the sheet list 0407 from the sheet library. A printing position adjustment button 0412 is a button to perform printing position adjustment on the sheet selected in the sheet list 0407.

FIG. 5 is a schematic diagram illustrating the interface screen on which the user edits the sheet attributes. An interface screen 0501 is displayed on the operation panel 0110 by the CPU 0105.

A sheet name is input in a text box 0502. A sheet size is input in a combo box 0503. Basis weight of a sheet is input in a text box 0504. The text boxes 0502 and 0504 receive input through a key pad provided on a software keyboard or the operation panel 0110. In the combo box 0503, it is possible to select a size from among the previously-registered list of the sheet sizes conveyable by the printing apparatus 0109. Alternatively, the combo box 0503 may further allow the user to select a custom size with which the user can freely input a size in each of the main-scanning direction and the sub-scanning direction, in addition to the regular sizes. A surface property of a sheet is specified by a combo box 0505. In the combo box 0505, it is possible to specify a surface property from among the previously-registered list of surface properties conveyable by the printing apparatus 0109. A grain of a sheet is specified by a combo box 0506. In the combo box 0506, it is possible to select one between long grain and short grain. A check box 0507 is used to specify whether the sheet is a preprinted paper. In a case where the sheet is a preprinted paper, the user checks the check box 0507.

When an edit end button 0508 is pressed, the sheet attributes input at that time are fixed and are saved in the sheet library. Thereafter, the interface screen 0501 is closed and the screen is returned to the interface screen 0401. When a cancel button 0509 is pressed, the edit pressing of the sheet attributes is canceled. The interface screen 0501 is closed, and the screen is returned to the interface screen 0401.

FIG. 6 illustrates the sheet library saved in the ROM 0103, the HDD 0106, etc. The schematic diagram is used here for description. However, the sheet library is actually saved in form of digital information, such as extensible markup language (XML) and comma separated value (CSV).

Sheet information 0601 to 0608 are registered in the sheet library.

Columns 0609 to 0618 indicate the sheet attributes that are specified by the user with respect to each of the sheets. The column 0609 indicates the sheet name. The columns 0610 to 0613 indicate the sheet attributes indicating physical properties of the sheets, which include the sheet size, the basis weight, the surface property, and the grain. The column 0614 indicates whether the sheet is a preprinted paper.

The columns 0615 to 0618 indicate the printing position deviation amount (deviation amount of image forming position) with respect to the front surface and the rear surface when each of the sheets is vertically placed and horizontally placed. The printing position deviation amount used herein indicates the position deviation amount from an ideal printing position, and includes items of a lead position, a side position, a main-scanning magnification, and a sub-scamming magnification in the first exemplary embodiment. In the actual printing, the printing apparatus 0109 performs adjustment based on the printing position deviation amounts such that printing is performed on the ideal printing position (i.e., performs adjustment so as to offset the printing position deviation amount), and performs the printing. The lead position and the side position indicate the printing position deviation amounts in the sub-scanning direction and the main-scanning direction, respectively, with respect to the sheet. The lead position is adjusted by changing a printing start position of the image such that a leading end of a sheet in the sheet conveyance direction is taken as a starting point, and the side position is adjusted by changing a printing start position of the image such that a sheet end on left side of a sheet in the sheet conveyance direction is taken as a starting point. More specifically, this adjustment is achieved by adjusting irradiation start timing of a laser beam that is applied from the image exposure device 0219 to the photosensitive drum 0116. The sub-scanning magnification indicates deviation of an image length in the sub-scanning direction (magnification with respect to ideal length). Specifically, the sub-scanning magnification is adjusted by controlling a driving speed of the transfer belt 0117. The main-scanning magnification indicates deviation of the image length in the main-scanning direction (magnification with respect to ideal length). Specifically, the main-scanning magnification is adjusted by controlling a clock frequency of the laser beam when the image exposure device 0219 modulates the digital image signal into the laser beam.

Alternatively, the controller 0108 may perform the image processing on the image data such that the output image is printed at the ideal printing position. Examples of the image processing for adjusting the printing position of the output image to the ideal printing position include affine transformation.

The controller 0108 adjusts the printing position based on the printing position deviation amounts such that the image is formed on the ideal printing position in the actual printing. The controller 0108 refers to the printing position deviation amounts of the sheet library to perform the image processing on the image data such that the printing position becomes the ideal printing position. Further, the controller 0108 transfers the image-processed image data to the printer 0113, and controls the image forming section 0114 to print the image on a target sheet based on the image data. In the printing apparatus according to the first exemplary embodiment, the printing position deviation amounts are held in the sheet library. Alternatively, information of correction amounts to correct the printing position deviation may be held by the sheet library. In this case, the CPU 0105 determines the correction amounts based on the printing position deviation amounts, and stores the correction amounts in the sheet library.

The printing position deviation amounts are calculated by printing an adjustment chart in which predetermined marks are disposed and detecting positions of the respective marks on the printed adjustment chart. An example of the adjustment chart is described with use of FIG. 7. An initial value of each of the printing position deviation amounts is zero, and the initial value is set in a case where the sheet information is newly registered in the sheet library, in a case where the sheet is registered but the printing position adjustment is not performed, or other cases.

FIG. 7 is a schematic diagram illustrating the example of the adjustment chart to be used in the printing position adjustment. The adjustment chart is printed in response to an instruction of the CPU 0105 after the printing position adjustment is started.

The printed adjustment chart has a front surface 0701 and a rear surface 0702. Images 0703 and 0704 are printed on the front surface and the rear surface of the adjustment chart, respectively, so as to allow the user to identify a conveyance direction. In FIG. 7, the sheet conveyance direction is represented by an arrow, and characters indicating whether a surface is the front surface or the rear surface is provided below the arrow. Alternatively, a front-rear identification mark that is easily determined from the scan image when the front surface and the rear surface are scanned by the scanner, may be provided. Marks 0705 are printed at specified positions of the adjustment chart. The marks 0705 are normally formed by toner of a color that has a large reflectance difference with respect to the sheet. In the first exemplary embodiment, the marks 0705 are formed by black toner. The marks 0705 are printed at eight positions, in total, including four corners on the front surface and the rear surface of the adjustment chart. When the printing position is coincident with the ideal position, The marks 0705 are printed and disposed at positions that are each distanced from a sheet end by a predetermined distance. Measuring relative positions of the marks 0705 on the adjustment chart provides the printing position deviation amounts. In the first exemplary embodiment, lengths indicated by (A) to (R) in FIG. 7 are measured. The lengths (A) and (B) correspond to a sub-scanning direction length and a main-scanning direction length of the adjustment chart, respectively, and the ideal lengths thereof are sheet lengths defined by the sheet library. Each of the lengths (C) to (R) corresponds to a distance from the corresponding mark 0705 to its closest sheet end.

FIG. 8 illustrates a method of calculating each of the printing position deviation amounts from the measurement values of the lengths (A) to (R).

Items 0801 to 0808 indicates the printing position deviation amounts. The items 0801 to 0804 respectively indicate the lead position, the side position, the main-scanning magnification, and the sub-scanning magnification on the front surface. The items 0805 to 0808 respectively indicate the lead position, the side position, the main-scanning magnification, and the sub-scanning magnification on the rear surface.

A column 0810 indicates calculation expressions to calculate measurement values of corresponding items from the measured values of the lengths (A) to (R) illustrated in FIG. 7. The measurement value of the lead position becomes an average value of distances ((C) and (E), and (K) and (M)) from the leading end of the sheet in the sheet conveyance direction to the corresponding marks. The measurement value of the side position becomes an average value of distances ((F) and (J), and (N) and (R)) from the sheet end on the left side in the sheet conveyance direction to the corresponding marks. The measurement value of the main-scanning magnification becomes an average value of the distances between the marks arranged along the same scan line in the main-scanning direction. The measurement value of the sub-scanning magnification becomes an average value of the distances between the marks arranged along the same scan line in the sub-scanning direction.

A column 0811 indicates the ideal values of the corresponding items. In this case, the marks 0705 are ideally printed at the position distanced from the corresponding sheet end by 1 cm. In this case, the ideal value of each of the lead position and the side position becomes 1 cm. The ideal value of the main-scanning magnification becomes a value obtained by subtracting 2 cm from the main-scanning direction sheet length of the sheet registered in the sheet library. The ideal value of the sub-scanning magnification becomes a value obtained by subtracting 2 cm from the sub-scanning direction sheet length of the sheet registered in the sheet library.

A column 0812 indicates calculation expressions to calculate final printing position deviation amounts of the items from the corresponding measurement value and the corresponding ideal value. The printing position deviation amount of each of the lead position and the side position is calculated by subtracting the ideal value from the measured value (unit is mm). The printing position deviation amount of each of the main-scanning magnification and the sub-scanning magnification is calculated by dividing a value that has been obtained by subtracting the ideal value from the measurement value, by the ideal value (unit is %). The calculated printing position deviation amounts are managed by the sheet library illustrated in FIG. 6.

The lengths (A) to (R) may be calculated through image analysis from a scan image that is the adjustment chart scanned by the scanner 0111, in addition to the method of actually measuring the lengths (A) to (R) by the user with use of a ruler, etc. In the method of calculating the lengths (A) to (R) from the scan image, the adjustment chart is placed at a predetermined position of the scanner 0111, and then scanned. The scanned image is analyzed by the CPU 0105, and the sheet ends of the adjustment chart and edges of the respective marks 0705 (boundaries between sheet base and marks 0705) are detected from density difference. The lengths (A) to (R) are calculated from the detected sheet ends and the detected edges of the marks 0705. Further, as the measurement method of the lengths (A) to (R), in addition to the scanner, for example, an imaging device such as a CCD camera may be disposed in the sheet conveyance path in printing, and the image may be acquired through imaging to calculate the lengths (A) to (R).

The processing as the feature of the first exemplary embodiment will be described with use of a flowchart.

A program of the printing apparatus 0109 according to the flowchart is held by the ROM 0103 or the HDD 0106 of the printing apparatus 0109, is load to the RAM 0104, and is executed by the CPU 0105.

Figure 9:
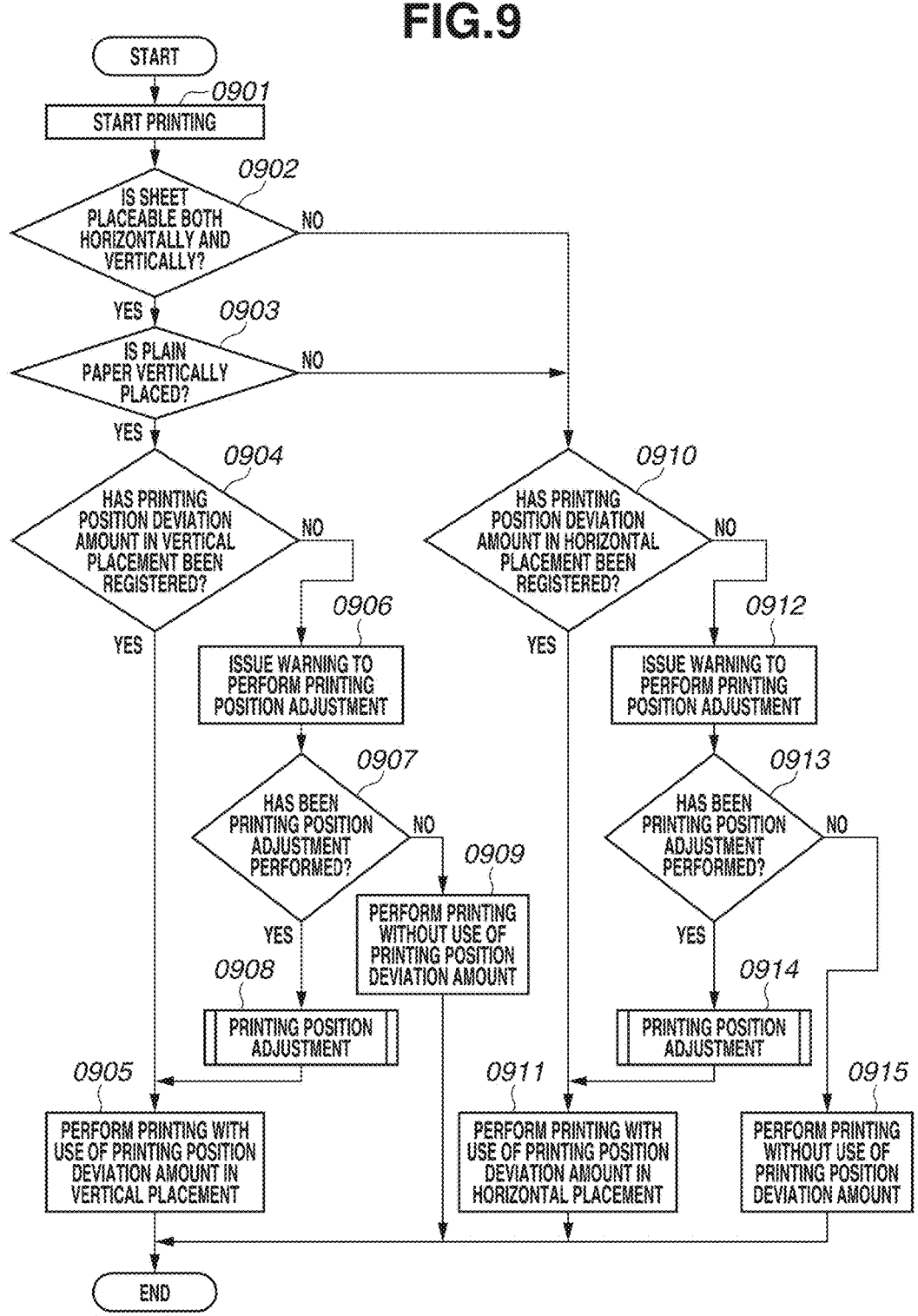
FIG. 9 is an operation flowchart of the printing apparatus in a first exemplary embodiment.

FIG. 9 is a flowchart to explain control of the printing apparatus 0109 in the first exemplary embodiment.

First, in a case where the I/O control unit receives the print job from the host computer 0101, the CPU 0105 starts printing. The print job may be previously held by the ROM 0103 or the HDD 0106 of the printing apparatus 0109. Next, in step S0902, the CPU 0105 determines whether a vertically-placed sheet and a horizontally-placed sheet are both settable as a sheet on which the image is to be printed, from the information indicating the sheet size included in the print job. For example, an A3 sheet is housed in the sheet deck only in a horizontally-placed state because of the configuration of the sheet feeder 0112. For example, an A4 sheet, an A5 sheet, and a letter are housed in the sheet deck in a horizontally-placed state and are also housed in a vertically-placed state because of the configuration of the sheet feeder 0112. In a case where the vertically-placed sheet and the horizontally-placed sheet are both settable (YES in step S0902), the processing proceeds to step S0903.

In step S0903, the CPU 0105 acquires storage information from the sheet feeder 0112, and selects a sheet based on the print job and the storage information. The storage information is information relating to the sheet housed in the sheet feeder 0112. The storage information includes, for example, the size of the sheet, the direction of the sheet, the basis weight of the sheet, the surface property of the sheet, and the grain of the sheet. In a case where the vertically-placed sheet is selected in step S0903 (YES in step S0903), the processing proceeds to step S0904. The vertical placement indicates that a longitudinal direction of the sheet is orthogonal to the conveyance direction of the sheet. When the vertically-placed sheet specified by the print job is housed in any of the sheet decks of the sheet feeder 0112, the CPU 0105 selects the vertically-placed sheet. Meanwhile, when the specified vertically-placed sheet is not housed in any of the sheet decks, the CPU 0105 determines whether a horizontally-placed sheet that is a substitution of the specified vertically-placed sheet is housed in any of the sheet decks. When the horizontally-placed sheet as a substitution is housed in any of the sheet decks, the CPU 0105 selects the horizontally-placed sheet as the substitution.

In step S0904, the CPU 0105 refers to the sheet library, and determines whether the printing position deviation amounts for the vertical placement have been registered. In a case where the CPU 0105 determines that the printing position deviation amounts for vertical placement have been registered (YES in step S0904), the processing proceeds to step S0905. In step S0905, the CPU 0105 prints the image on the sheet after performing the printing position adjustment based on the registered printing position deviation amounts for vertical placement, and then the processing ends.

In step S0904, in a case where the CPU 0105 determines that the printing position deviation amounts for vertical placement have not been registered (NO in step S0904), the processing proceeds to step S0906. In step S0906, the CPU 0105 displays, on the operation panel 0110, a warning screen (not illustrated) that prompts the user to execute the printing position adjustment using the vertically-placed sheet, and the processing proceeds to step S0907. In step S0907, the operation panel 0110 functions as a notification unit. In step S0907, the CPU 0105 displays the sheet list 0407 on the operation panel 0110. The user selects the vertically-placed sheet to be used for printing, from the sheets displayed in the sheet list 0407, and presses the printing position adjustment button 0412. In a case where the printing position adjustment button 0412 is pressed (YES in step S0907), the processing proceeds to step S0908. In step S0908, the CPU 0105 controls the sheet feeder 0112 to feed the sheet from the sheet deck in which the selected vertically-placed sheet is housed, and performs the printing position adjustment using the vertically-placed sheet. The operation flow of the printing position adjustment is described later with use of FIG. 10. After the printing position adjustment ends, the processing proceeds to step S0905. The image is printed on the sheet with use of the printing position deviation amounts updated in step S0908, and then the processing ends.

In step S0907, in a case where the printing position adjustment button 0412 is not pressed, that is, in a case where the user selects inexecution of the printing position adjustment (NO in step S0907), the processing proceeds to step S0909. In a case where the printing position adjustment is not executed, the adjustment values to correct the printing position deviation amounts for vertical placement are the initial values (initial values are zero). In step S0909, the CPU 0105 prints the image on the sheet without correcting the printing position deviation, and then the processing ends.

In a case where the horizontally-placed sheet is selected in step S0903 (NO in step S0903), the processing proceeds to step S0910. The horizontal placement indicates that the longitudinal direction of the sheet becomes parallel to the conveyance direction of the sheet.

In step S0910, the CPU 0105 refers to the sheet library and determines whether the printing position deviation amounts for horizontal placement have been registered. In a case where the CPU 0105 determines that the printing position deviation amounts for horizontal placement have been registered (YES in step S0910), the processing proceeds to step S0911. In step S0911, the CPU 0105 prints the image on the sheet after performing the printing position adjustment based on the registered printing position deviation amounts for horizontal placement, and then the processing ends.

In a case where the CPU 0105 determines that the printing position deviation amounts for horizontal placement have not been registered in step S0910 (NO in step S0910), the processing proceeds to step S0912. In step S0912, the CPU 0105 displays, on the operation panel 0110, a warning screen (not illustrated) that prompts the user to execute the printing position adjustment using the vertically-placed sheet, and the processing proceeds to step S0913. In step S0913, the CPU 0105 displays the sheet list 0407 on the operation panel 0110. The user selects the horizontally-placed sheet to be used for printing, from the sheets displayed in the sheet list 0407, and presses the printing position adjustment button 0412. In a case where the printing position adjustment button 0412 is pressed (YES in step S0913), the processing proceeds to step S0914. In step S0914, the CPU 0105 controls the sheet feeder 0112 to feed the sheet from the sheet deck in which the selected horizontally-placed sheet is housed, and performs the printing position adjustment using the horizontally-placed sheet. The operation flow of the printing position adjustment is separately described later with use of FIG. 10, as with step S0908. After the printing position adjustment ends, the processing proceeds to step S0911. The image is printed on the sheet with use of the printing position deviation amounts updated in step S0914, and then the processing ends.

In step S0913, in a case where the printing position adjustment button 0412 is not pressed, namely, in a case where the user selects inexecution of the printing position adjustment (NO in step S0913), the processing proceeds to step S0915. In the case where the printing position adjustment is not executed, the adjustment values to correct the printing position deviation amounts for horizontal placement are the initial values (initial values are zero). In step S0915, the CPU 0105 prints the image on the sheet without correcting the printing position deviation, and then the processing ends.

In a case where, in step S0902, the vertically-placed sheet and the horizontally-placed sheet are both not settable as the sheet in which the image is to be printed (NO in step S0902), the CPU 0105 determines whether the printing position deviation amounts for selected sheet have been registered. In a case where the printing position deviation amounts for selected sheet have not been registered, the CPU 0105 prompts the user to execute the printing position adjustment. In the following, the description is given assuming that the horizontally-placed sheet has been selected. The processing proceeds to step S0910. In the case where the CPU 0105 determines that the printing position deviation amounts for horizontal placement have been registered (YES in step 0910), the processing proceeds to step S0911. In the case where the CPU 0105 determines that the printing position deviation amounts for horizontal placement have not been registered (NO in step S0910), the processing proceeds to step S0912.

As a flow not illustrated in FIG. 9, the operation of the printing apparatus 0109 in a case where the sheet attribute information has been updated is described. For example, after the printing position adjustment is performed, the printing apparatus 0109 waits until the user displays the interface screen 0501 for editing of the sheet attribute information. At this time, it may be additionally displayed on the interface screen 0501 that the printing position adjustment has been performed on one or both of the vertical placement and the horizontal placement. When the user displays the interface screen 0501, the CPU 0105 receives change of the information of the sheet grain through the combo box 0506 that is displayed on the operation panel 0110, and receives edit end through the edit end button 0508. Thereafter, the CPU 0105 refers to the sheet library in the HDD 0106, and deletes both of the printing position deviation amounts in vertical placement and the printing position deviation amounts in horizontal placement that have been held and saved. The processing then ends.

In the first exemplary embodiment, the flowchart in which the warning is issued to prompt the user to execute the printing position adjustment when the printing position deviation amounts have not been registered, and the printing position adjustment is executed when the user selects execution of the printing position adjustment, is described. Alternatively, the printing position adjustment may be executed irrespective of registration of the printing position deviation amounts, or the printing position adjustment may be automatically executed when the user does not select execution. The reason, the timing, and the execution form of the printing position adjustment are not limited.

In the first exemplary embodiment, the printing position deviation amounts are deleted in response to the change of the information of the sheet grain in the flow. However, the sheet attribute may be, for example, a transfer voltage or a fixing temperature that influences the printing position deviation amounts of the sheet, and thus the contents are not limited.

According to the first exemplary embodiment, the appropriate printing position deviation amounts corresponding to the direction of the sheet are calculated, acquired, saved, and applied through the above-described procedure, which makes it possible to perform the appropriate printing position adjustment irrespective of the direction of the sheet. Accordingly, it is possible to improve accuracy of the printing position adjustment.

In the first exemplary embodiment, in the case where the attribute influencing the printing position adjustment of the sheet, such as the grain of the sheet, is changed, deleting the printing position deviation amount of the sheet library. This procedure prevents the printing position deviation amount from being applied without being updated even when, normally, the printing position deviation amount should be updated.

However, there can be a case where the printing position deviation amount is reused without being deleted, which is, for example, a case where the user temporarily uses a sheet having a grain different from a grain of a sheet subjected to the printing position adjustment or a case where the user changes an attribute without knowing that the change influences the printing position adjustment.

Further, the printing apparatus 0109 described in the first exemplary embodiment refers to the sheet information used in the print job and the storage information of the sheet feeder 0112, and determines to feed the vertically-placed sheet or the horizontally-placed sheet. An existing image forming apparatus, however, selects a sheet deck from which the sheet is to be fed, based on only the information of the sheet size. In other words, the existing printing apparatus determines, from among the plurality of sheet decks included in the sheet feeder 0112, the sheet deck from which the sheet is to be fed, based on a previously-determined priority order.

Accordingly, in the printing apparatus described in a second exemplary embodiment, in a case where the print job specifying only the information of the sheet size is executed in a state where both of the vertically-placed sheet and the horizontally-placed sheet corresponding to the sheet specified by the print job are housed in the sheet feeder 0112, the CPU 0105 selects the sheet, of which printing position deviation amounts have been already held, from the vertically-placed sheet and the horizontally-placed sheet. Thereafter, the CPU 0105 controls the sheet feeder 0112 to feed the selected sheet from the sheet deck. In addition, when the sheet information that influences the printing position deviation amount is changed in the sheet library, the CPU 0105 replicates the sheet information and saves the current printing position deviation amount.

In the printing apparatus 0109 of the second exemplary embodiment, in the case where the attribute that influences the printing position deviation amount of the sheet, such as the information indicating the grain of the sheet, is changed, the printing position deviation amount of a replication destination is held and the printing position deviation amount of a replication source is deleted. The operation of the printing apparatus 0109 at this time, however, is not limited to the one described-above as long as a mechanism does not apply the false printing position deviation amount, that is for example, a mechanism prompts the user to update the printing position deviation amount of the replication source or a mechanism automatically executes the printing position adjustment. In the printing apparatus 0109 of the second exemplary embodiment, the printing position deviation amount is deleted in response to the change of the information indicating the grain of the sheet in the flowchart. However, the sheet attribute may be, for example, a transfer voltage or a fixing temperature that influences the printing position deviation amount of the sheet, and thus the contents are not limited.

With the above described procedure, it is possible to easily and accurately perform the printing after the printing position adjustment is performed, even in the case where the same sheets have been fed in both of the vertical placement and the horizontal placement, and the printing position adjustment has been performed in only one of the directions. Further, even in the case where the sheet library is replicated, it is possible to hold the printing position deviation amount and to reuse the printing position deviation amount.

The printing position adjustment is described based on FIG. 10. The program of the printing position adjustment illustrated in FIG. 10 is held by the ROM 0103 or the HDD 0106, is loaded to the RAM 0104, and is executed by the CPU 0105.

In step S1101, the CPU 0105 controls the sheet feeder 0112 to feed the sheet, and controls the printer 0113 to print the adjustment chart on the sheet. The processing then proceeds to step S1102. In step S1102, the CPU 0105 receives a scanning instruction of the sheet that has been placed on the platen glass 0302 and on which the adjustment chart has been printed, and acquires a scan image through the CCD sensor. In step S1103, the CPU 0105 uses the scan image acquired in step S1102 to detect the values of the respective lengths (A) to (R) illustrated in FIG. 7, and calculates the printing position deviation amounts by the calculation expressions illustrated in FIG. 8. Then, the processing proceeds to step S1104, and the CPU 0105 stores the printing position deviation amounts calculated in Step S1103 in the sheet library, as the printing position deviation amounts of the current (vertically-placed) sheet selected in the interface screen (FIG. 4). Further, in step S1105, the CPU 0105 refers to the sheet library in the HDD 0106, and updates the values stored in the sheet library in step S1104, as the printing position deviation amounts for the vertically-placed sheet.

Embodiments of the present invention are also realized by executing the following processing. In other words, software (program) achieving the functions of the above-described exemplary embodiments is supplied to a system or an apparatus through a network or various kinds of storage media, and a computer (or CPU, microprocessor unit (MPU), etc.) of the system or the apparatus reads and executes the program.

The printing apparatus described above has the configuration in which the printing position deviation amounts are held by the sheet library. However, the adjustment values to correct the printing position deviation may be held by the sheet library. In this case, the CPU 0105 determines the adjustment values based on read data relating to the sheet on which the adjustment chart has been printed, and stores the adjustment values in the sheet library.

Embodiments of the present invention make it possible to achieve high-precision printing position adjustment suitable for the direction of the sheet to be conveyed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-004548, filed Jan. 13, 2017, which is hereby incorporated by reference herein in its entirety.

What is claimed is:

1. An image forming apparatus, comprising:
a plurality of decks in which a plurality of sheets is contained;
a conveyer configured to convey a sheet from the plurality of decks;
an image former configured to form an image on the sheet conveyed by the conveyer; and
a controller configured to:
control to the image former to form a test image on the sheet;
generate an adjustment condition based on read data related to the test image formed on the sheet;
store the adjustment condition, wherein the adjustment condition is associated with a size of the sheet, and a direction of the sheet conveyed by conveyer, and a grain of the sheet;
select the adjustment condition based on the size of the sheet, the direction of the sheet, and the grain of the sheet; and
adjust, based on the selected adjustment condition, a position of the image to be formed on the sheet by the image former,
wherein the controller controls the image former to form a first test image on a first sheet, and generates a first adjustment condition based on a first read data related to the first test image formed on the first sheet,
wherein a grain of the first sheet is parallel to a long side of the first sheet;
wherein the controller controls the image former to form a second test image on a second sheet, and generates a second adjustment condition based on a second read data related to the second test image formed on the second sheet,
wherein a grain of the second sheet is parallel to a short side of the second sheet.

2. The image forming apparatus according to claim 1, wherein the direction includes a first direction and a second direction,
wherein the first direction is a direction in which a longitudinal direction of the sheet is orthogonal to a conveyance direction of the sheet conveyed by the conveyer, and
wherein the second direction is a direction in which the longitudinal direction of the sheet is parallel to the conveyance direction.

3. The image forming apparatus according to claim 1, further comprising:
a memory in which the adjustment condition is stored; and
a display configured to display a screen to notify whether the adjustment condition associated with the size of the sheet, the direction of the sheet, and the grain of the sheet, is stored on the memory or not.

4. The image forming apparatus according to claim 1, wherein the grain of the sheet includes a long grain that is parallel to a long side of the sheet and a short grain that is parallel to a short side of the sheet.

5. The image forming apparatus according to claim 1, wherein the adjustment condition is associated with a grammage of the sheet;
wherein the controller selects the selected adjustment condition based on the size of the sheet, the direction of the sheet, the grain of the sheet, and the grammage of the sheet.

* * * * *